(12) United States Patent
Krieger et al.

(10) Patent No.: US 7,537,079 B2
(45) Date of Patent: May 26, 2009

(54) PASSIVELY REPHASING PISTON

(75) Inventors: Daniel J. Krieger, Bismarck, ND (US);
Matthew R. Kettner, Litchfield, MN (US)

(73) Assignee: Clark Equipment Company, West Fargo, ND (US)

( * ) Notice: Subject to any disclaimer, the term of this patent is extended or adjusted under 35 U.S.C. 154(b) by 330 days.

(21) Appl. No.: 11/651,660

(22) Filed: Jan. 10, 2007

(65) Prior Publication Data

US 2007/0144819 A1 Jun. 28, 2007

Related U.S. Application Data (63) Continuation-in-part of application No. 11/087,338, filed on Mar. 23, 2005.

(51) Int. Cl.
*F01B 31/00* (2006.01)
(52) U.S. Cl. .......................... 180/414; 92/183; 92/182; 92/184; 92/185; 180/434; 180/439; 180/442; 180/441
(58) Field of Classification Search .................. 92/182, 92/183, 184, 185
See application file for complete search history.

(56) References Cited

U.S. PATENT DOCUMENTS

| 2,462,580 A | 2/1949 | Watson ...................... 121/41 |
| 2,783,849 A | 3/1957 | Armington et al. .......... 180/79.2 |
| 3,502,202 A | 3/1970 | Whiteman, Jr. ............. 91/178 |
| 3,583,282 A | 6/1971 | Cope .......................... 91/25 |

(Continued)

FOREIGN PATENT DOCUMENTS

| EP | 1 006 075 A1 | 6/2000 |
| GB | 517314 | 3/1938 |

OTHER PUBLICATIONS

International Search Report for Application No. PCT/US2006/010603, filed Mar. 23, 2006. Date of Mailing: Jul. 24, 2006.

(Continued)

*Primary Examiner*—Paul N Dickson
*Assistant Examiner*—Marlon A Arce
(74) *Attorney, Agent, or Firm*—John D. Veldhuis-Kroeze; Westman, Champlin & Kelly, P.A.

(57) ABSTRACT

A piston is disclosed that includes a longitudinal passage disposed between outlets on the opposing faces of the piston, and a radial passage extending from a node with the longitudinal passage to an outlet on the annular wall between opposing piston seals. Check valves are disposed in the longitudinal passage between the node and each of the piston faces, such that each of the check valves enables fluid flow from its inlet to the outlet on the annular wall, and block fluid flow from the outlet on the annular wall to the inlet. In the event of pistons in a fluid system becoming out of phase with each other, fluid may be admitted through the inlet of the longitudinal passage and the respective check valve and out a side wall outlet, thereby bypassing the piston to exit via the respective end port, until another, out-of-phase piston or pistons in the system also reach full extension or retraction, automatically returning all pistons in the system to be in phase with each other.

20 Claims, 5 Drawing Sheets

U.S. PATENT DOCUMENTS

| | | | |
|---|---|---|---|
| 3,627,053 A | 12/1971 | Hook et al. ..................... 172/9 |
| 3,856,102 A * | 12/1974 | Queen ....................... 180/414 |
| 3,916,624 A * | 11/1975 | Machens et al. .............. 60/394 |
| 4,164,122 A | 8/1979 | Ward .......................... 60/547 |
| 4,241,641 A * | 12/1980 | Reinert ..................... 91/189 A |
| 4,354,688 A | 10/1982 | Swanson ................. 280/43.23 |
| 4,655,031 A | 4/1987 | Kucera ....................... 56/11.9 |
| 4,738,315 A * | 4/1988 | Kinzenbaw ................. 172/310 |
| 4,916,624 A * | 4/1990 | Collins et al. ............... 700/132 |
| 4,976,336 A * | 12/1990 | Curran ....................... 187/208 |
| 4,986,393 A | 1/1991 | Preukschat et al. ....... 188/266.6 |
| 5,092,419 A | 3/1992 | Leiber et al. ................ 180/414 |
| 5,427,182 A | 6/1995 | Winter .......................... 172/2 |
| 5,573,366 A | 11/1996 | Meijer ........................ 414/664 |
| 6,000,315 A * | 12/1999 | Graham et al. ................. 91/520 |
| 6,050,430 A | 4/2000 | Fleagle et al. ................ 212/278 |
| 6,408,977 B1 | 6/2002 | Obertrifter et al. .......... 180/442 |
| 6,550,566 B1 | 4/2003 | Engelbrecht ................ 180/432 |
| 6,655,492 B2 | 12/2003 | Juul et al. .................... 180/419 |
| 2001/0004032 A1 | 6/2001 | Zenker et al. ............... 180/414 |
| 2006/0213715 A1 | 9/2006 | Krieger ...................... 180/408 |

OTHER PUBLICATIONS

Office Action for U.S. Appl. No. 11/087,338 mailed Mar. 15, 2006.
Response to Office Action mailed Mar. 15, 2006 for U.S. Appl. No. 11/087,338, filed Apr. 5, 2006.
Office Action for U.S. Appl. No. 11/087,338 mailed Jul. 3, 2006.
Amendment filed Oct. 3, 2006 for U.S. Appl. No. 11/087,338.

* cited by examiner

PASSIVELY REPHASING PISTON

CROSS-REFERENCE TO RELATED APPLICATION

This application claims the benefit of and priority to U.S. patent application Ser. No. 11/087,338, entitled "SELF-SYNCHRONIZING HYDRAULIC SYSTEM", filed Mar. 23, 2005, which is incorporated by reference herein.

BACKGROUND

The present invention relates to a fluid system, and particularly to a passively rephasing piston.

Hydraulic systems with pressurized flow to multiple cylinders have traditionally provided important solutions to a variety of applications. As one example, the steering systems for a variety of vehicles have traditionally often involved a hydraulic system wherein the extension and retraction of a hydraulic cylinder drives the steering of the vehicle's wheels or other components involved in steering. In such a system, in the case of a single-rod cylinder, pressurized flow is supplied alternately to the base end or the rod end of a cylinder, causing the cylinder's piston to extend or retract, thereby controlling the steering component. Similarly, in the case of a double-rod cylinder, pressurized flow is supplied alternately to the first end or the second end of a cylinder, causing the cylinder's piston to extend one way or extend the other way, thereby controlling the steering component.

For example, some systems include multiple cylinders that are operated together, but with independent control of individual cylinders, such as through a selector valve. In such a system, there has traditionally been an undesirable effect in which the cylinders become unsynchronized, wherein the extension or retraction position of one cylinder's piston is offset from the position of another cylinder's piston. One way in which this undesirable effect has traditionally been addressed is by providing the steering selector valve with multiple steering modes and the cylinders with position sensors, allowing an operator to refer to the position sensors to synchronize the cylinders manually by redirecting flow to the appropriate side. However, there has been an unmet need in some applications for an alternative to this traditional solution.

The discussion above is merely provided for general background information and is not intended to be used as an aid in determining the scope of the claimed subject matter.

SUMMARY

New systems, methods, tools, and interfaces provide efficient and effective solution to the problems discussed above, such as by providing a simple and inexpensive mechanism for passively and reliably rephasing a piston, among other advantages and benefits.

A passively rephasing piston is disclosed that includes a longitudinal passage disposed between outlets on the opposing faces of the piston, and a radial passage extending from a node with the longitudinal passage to an outlet on the annular wall between opposing piston seals, in an illustrative embodiment. Components such as check valves are disposed in the longitudinal passage between the node and each of the piston faces, such that each of the check valves enables fluid flow from its inlet to the outlet on the annular wall, and block fluid flow from the outlet on the annular wall to the inlet.

The piston may advantageously be used in a cylinder. The cylinder has end walls on either side of a side wall, and end ports in the side wall near each of the two end walls, with a connecting rod connected to the piston emerging through one of the end walls, defining a retraction end, in an illustrative embodiment. The cylinder may be used in a fluid system comprising at least one cylinder with the piston with the radial and longitudinal passages.

In the event of the pistons in such a fluid system becoming out of phase with each other, the passively rephasing piston will be either fully extended or fully retracted when a piston in a different cylinder is not yet fully retracted or extended. In this case, fluid being directed into the fully driven piston may be admitted through the inlet of the longitudinal passage accessible from the respective work chamber, through the respective check valve and out the side wall outlet, thereby bypassing the piston to exit via the respective end port. This fluid bypass mechanism may continue until the other, out-of-phase piston or pistons in the system also reach full extension or retraction, returning all pistons in the system to be in phase with each other. This effect is achieved passively and automatically, with no need of attention from an operator. It also requires no novel hardware outside of the piston itself, in an illustrative embodiment, thereby providing passive rephasing capability compatible with an otherwise traditional fluid system, with a minimum of alteration or expense.

This is useful for a wide variety of applications, such as, for example, a four-wheel-steering vehicle in which each of two cylinders controls the steering for each of two pairs of wheels on the vehicle. Additional embodiments and benefits are readily perceptible to those skilled in the relevant art, from the specification, figures and claims herein.

The Summary and Abstract herein are provided to introduce a selection of concepts in a simplified form that are further described below in the Detailed Description. The Summary and Abstract are not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
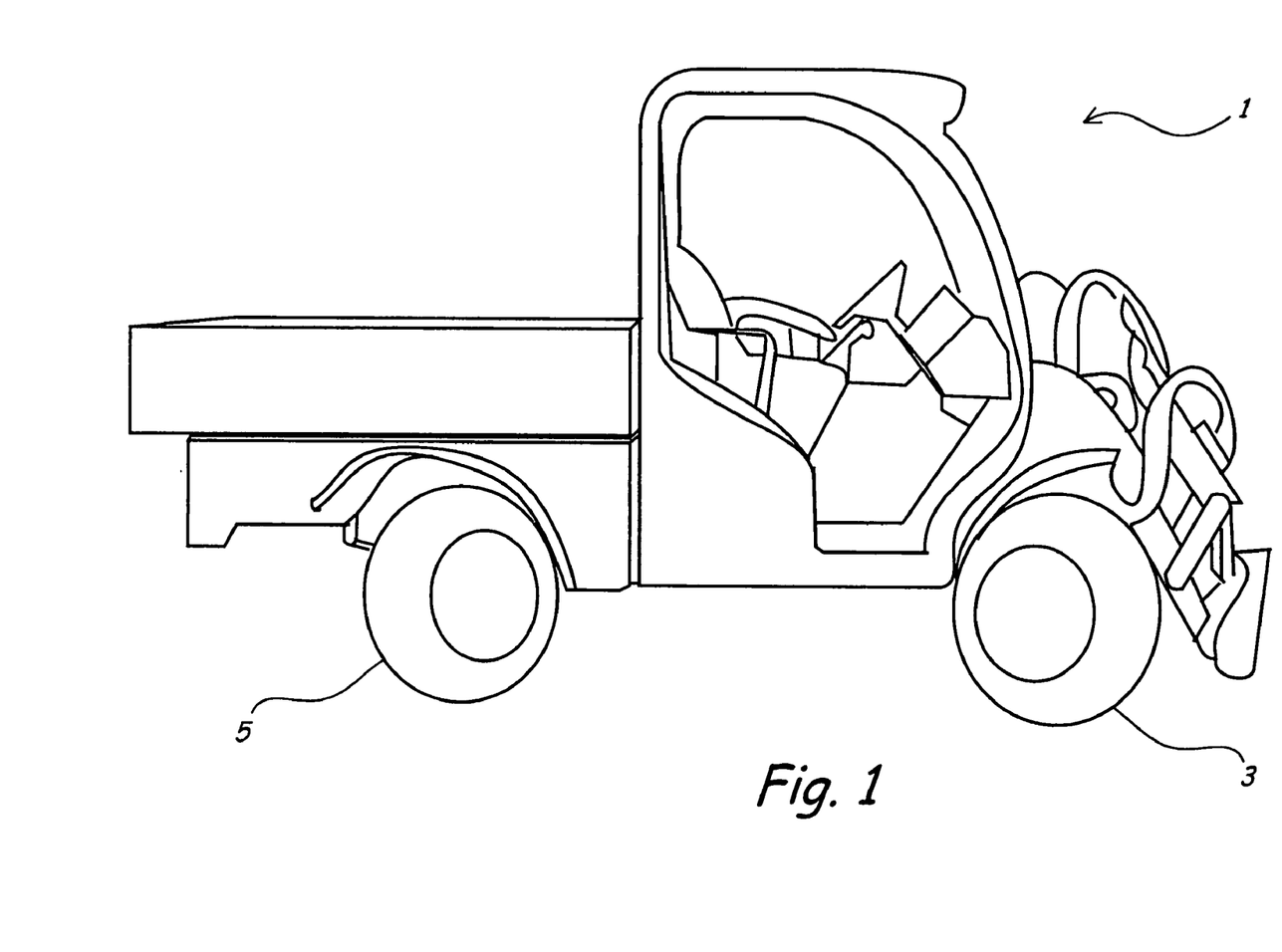
FIG. 1 is a depiction of a wheeled vehicle incorporating pistons and a fluid system, according to one illustrative embodiment.

FIG. 1 depicts a four-wheel-steering vehicle 1 that may incorporate a fluid system of the present invention. Vehicle 1 includes a pair of front steering wheels, one of which is visible as wheel 3, which are controlled by a front steering cylinder. A pair of rear steering wheels, one of which is visible as wheel 5, are controlled by a rear steering cylinder. To steer vehicle 1 to the left, the front wheels would be turned to the left and the rear wheels would be turned to the right, and vice versa; to steer vehicle 1 to the right, the front wheels would be turned to the right and the rear wheels would be turned to the left.

This provides the four-wheel-steering vehicle with a tighter turn radius and other advantages over an otherwise similar vehicle with steering in either the front wheels alone or the rear wheels alone. Four-wheel-steering vehicle 1 is one illustrative application among a wide variety of applications in which the present invention may be usefully and beneficially included.

Figure 2:
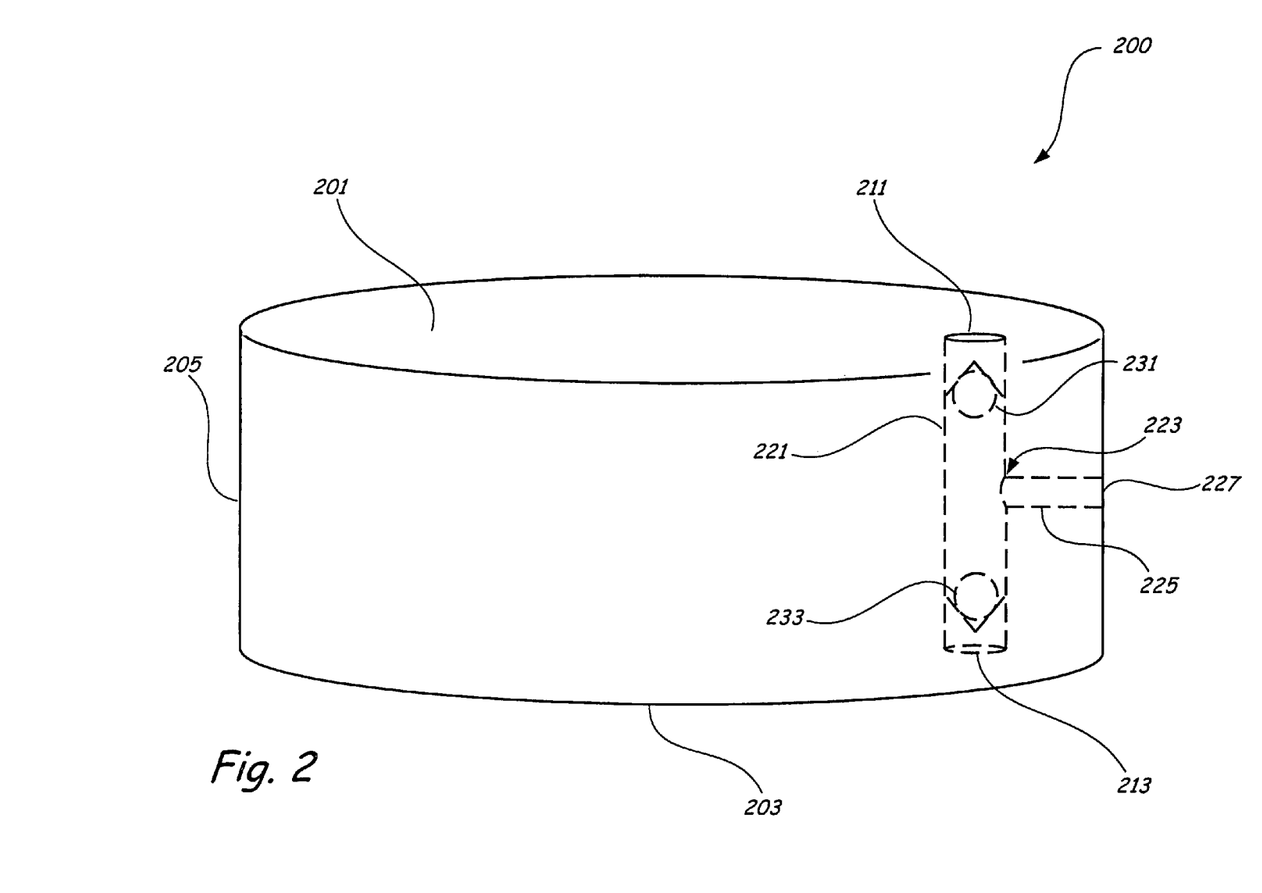
FIG. 2 is a perspective, cutaway diagram of a piston, according to an illustrative embodiment.

FIG. 2 is a perspective, cutaway diagram of a piston 200, according to an illustrative embodiment. Piston 200 includes a piston body having a first face 201, a second face 203 disposed opposite the first face, and an annular side wall 205 disposed between the first face 201 and the second face 203. Piston 200 also includes a longitudinal bore passage 221 disposed between an inlet 211 on the first face 201 and an inlet 213 on the second face 203. Radial bore passage 225 extends from a node 223 with the longitudinal bore passage 221 to an outlet 227 on the annular wall 205.

Piston 200 includes a check valve 231 disposed in longitudinal bore passage 221 between inlet 211 and node 223, and another check valve 233 disposed in longitudinal bore passage 221 between inlet 213 and node 223. Check valves 231 and 233 are illustrative examples of one-way passages, configured to admit fluid in one direction but not the other. For example, check valve 231 is disposed to enable a fluid flow from inlet 211 to node 223 and outlet 227, while it blocks fluid flow from node 223 from passing to inlet 211; and check valve 233 is disposed to enable a fluid flow from inlet 213 to node 223 and outlet 227, while it blocks fluid flow from node 223 from passing to inlet 213.

A variety of mechanisms may be used to achieve one-way passages in various embodiments, including a ball check valve, a swing check valve, or a clapper valve, a relief valve, among other alternatives. The one-way passage may be configured to admit fluid in the direction toward node 223 only if a sufficient differential pressure occurs on opposing sides of the one-way passage. Some nominal or minimal pressure may be used in some embodiments, while a differential pressure substantially higher than normal operating pressures may be used in other embodiments. The flow characteristics of piston 200 may be further illustrated with reference to the additional figures.

Figure 3:
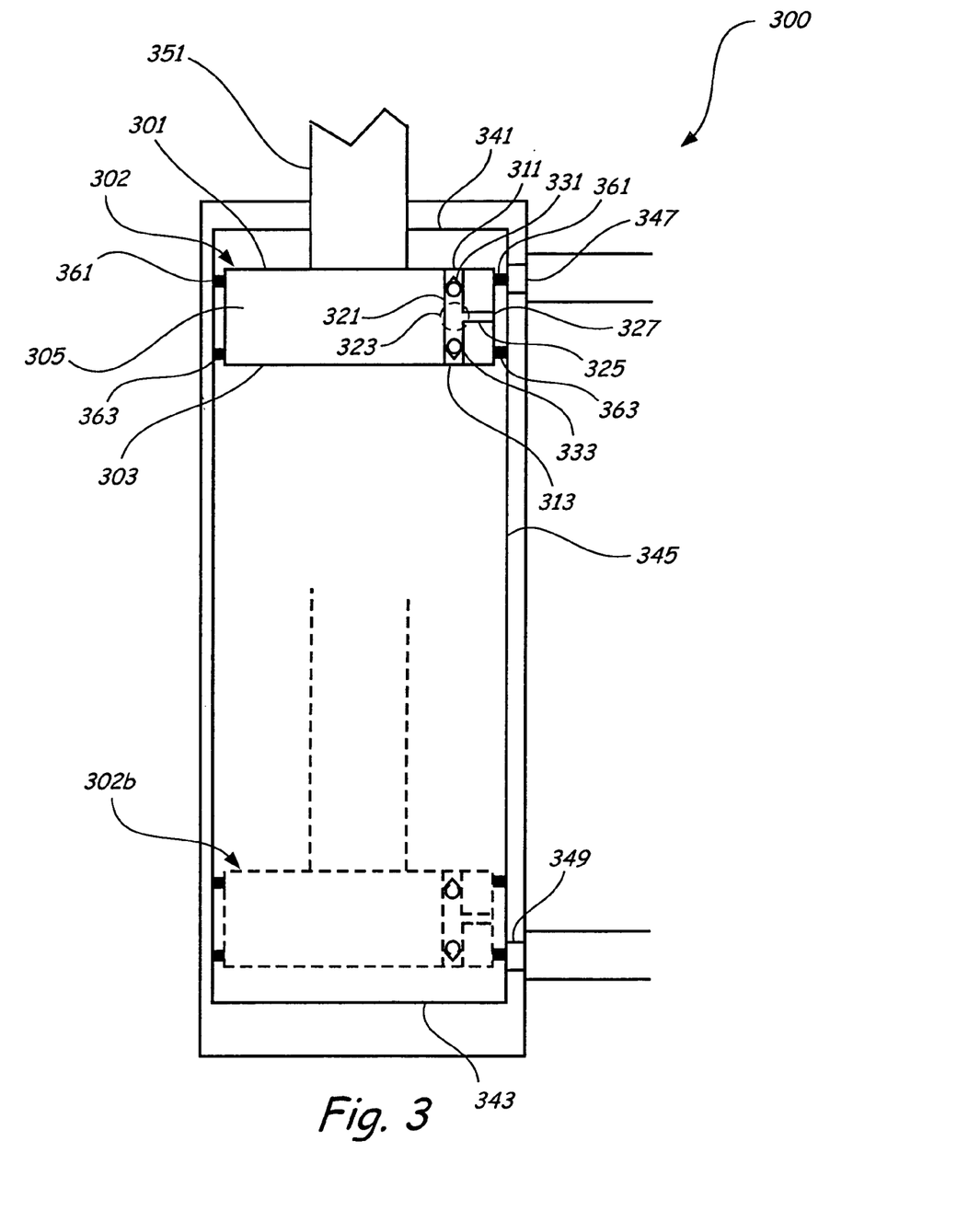
FIG. 3 is a block diagram of a cylinder, according to an illustrative embodiment.

FIG. 3 depicts a cylinder 300, according to an illustrative embodiment. Cylinder 300 includes piston 302, which includes bore passages similar to piston 200 of FIG. 2. Cylinder 300 includes an extension end wall 341, a retraction end wall 343, and a cylindrical side wall 345 disposed between the extension end wall 341 and the retraction end wall 343. Cylinder 300 also includes extension end port 347 and retraction end port 349 in cylindrical side wall 345, substantially adjacent to the extension end of cylinder and the retraction end of the cylinder, respectively. They are substantially adjacent to the extension and retraction ends insofar that they are near enough to fulfill the nominal function of cylinder 300, in this embodiment, an illustrative example of which is depicted in FIG. 3. A connecting rod 351 is operably connected to the piston 302 and disposed through the extension end wall 341, such that it can be connected to external hardware to be driven by cylinder 300.

Piston 302 is depicted in solid lines in an extended position adjacent to extension end wall 341, and in dashed lines (as piston 302b) in a retracted position adjacent to retraction end wall 343. Piston 302 includes extension end face 301 facing the extension end wall 341, retraction end face 303 facing the retraction end wall 343, and an annular side wall 305 that conformingly opposes the cylindrical side wall 345. Piston 302 also includes a fluid passage 321 disposed through piston 302 between extension chamber inlet 311 disposed on extension end face 301 and retraction chamber inlet 313 disposed on retraction end face 303. Fluid passage 321 connects at node 323 with a radial fluid passage 325 that extends laterally to annular wall outlet 327 disposed on the annular side wall 305. Fluid passage 321 thereby defines a first fluid passage 311-323 that extends from extension chamber inlet 311 to node 323, and a second fluid passage 313-323 that extends from retraction chamber inlet 313 to node 323.

The first fluid passage 311-323 includes a first check valve 331 enabling fluid flow from extension chamber inlet 311 to the annular wall outlet 327, and blocking fluid flow from the annular wall outlet 327 back to the extension chamber inlet 311. Similarly, the second fluid passage 313-323 is disposed through piston 302 from retraction chamber inlet 313 disposed on the retraction end face 303 to annular wall outlet 327, which in this embodiment, coincides with the annular wall outlet connected to first fluid passage 311-323. (FIG. 5 below provides a differing illustrative embodiment.) The second fluid passage 313-323 includes second check valve 333 enabling fluid flow from the retraction chamber inlet 313 to the annular wall outlet 327, and blocks fluid flow from the annular wall outlet 327 to the retraction chamber inlet 313.

Piston 302 also includes first seal 361 disposed on the annular side wall 305 between the annular wall outlet 327 and the extension end face 301, and a second seal 363 disposed on the annular side wall 305 between the outlet 327 on the annular side wall 305 and the retraction end face 303, in this illustrative embodiment. Seals 361 and 363 translatingly engage the cylindrical side wall 345.

First seal 361 is disposed such that when piston 302 approaches its full stroke extended position, adjacent to extension end wall 341, first seal 361 is positioned adjacent to extension end port 347, which is wider than first seal 361. This allows for fluid flowing through second fluid passage 313-323 and annular wall outlet 327 to begin flowing around first seal 361 and emerge into extension end port 347, from which it is free to flow out of cylinder 300, and to bypass piston 302 into the extension end of the cylinder 300, between extension end face 301 of piston 302 and extension end wall 341 of cylinder 300. Either way, this escape route for the fluid around first seal 361 will reduce the pressure being exerted against retraction end face 303; if fluid flow from the retraction end of the cylinder continues, fluid may continue bypassing first seal 361 into the extension end of the cylinder 300 until the pressure against extension end face 301 equalizes with that against retraction end face 303.

Similarly, second seal 363 is disposed such that when piston 302 approaches its full stroke retracted position, adjacent to retraction end wall 343, second seal 363 is positioned adjacent to retraction end port 349, allowing for fluid flowing through first fluid passage 311-323 and annular wall outlet 327 to flow around second seal 363 and emerge into retraction end port 349, from which it is free to flow out of cylinder 300, and to bypass piston 302 into the retraction end of the cylinder 300, between retraction end face 303 of piston 302 and retraction end wall 343 of cylinder 300.

The portion of the fluid that exits the cylinder altogether through extension end port 347 or retraction end port 349 becomes available to rephase another cylinder within a larger fluid system, as discussed further below with reference to FIG. 4.

Figure 4:
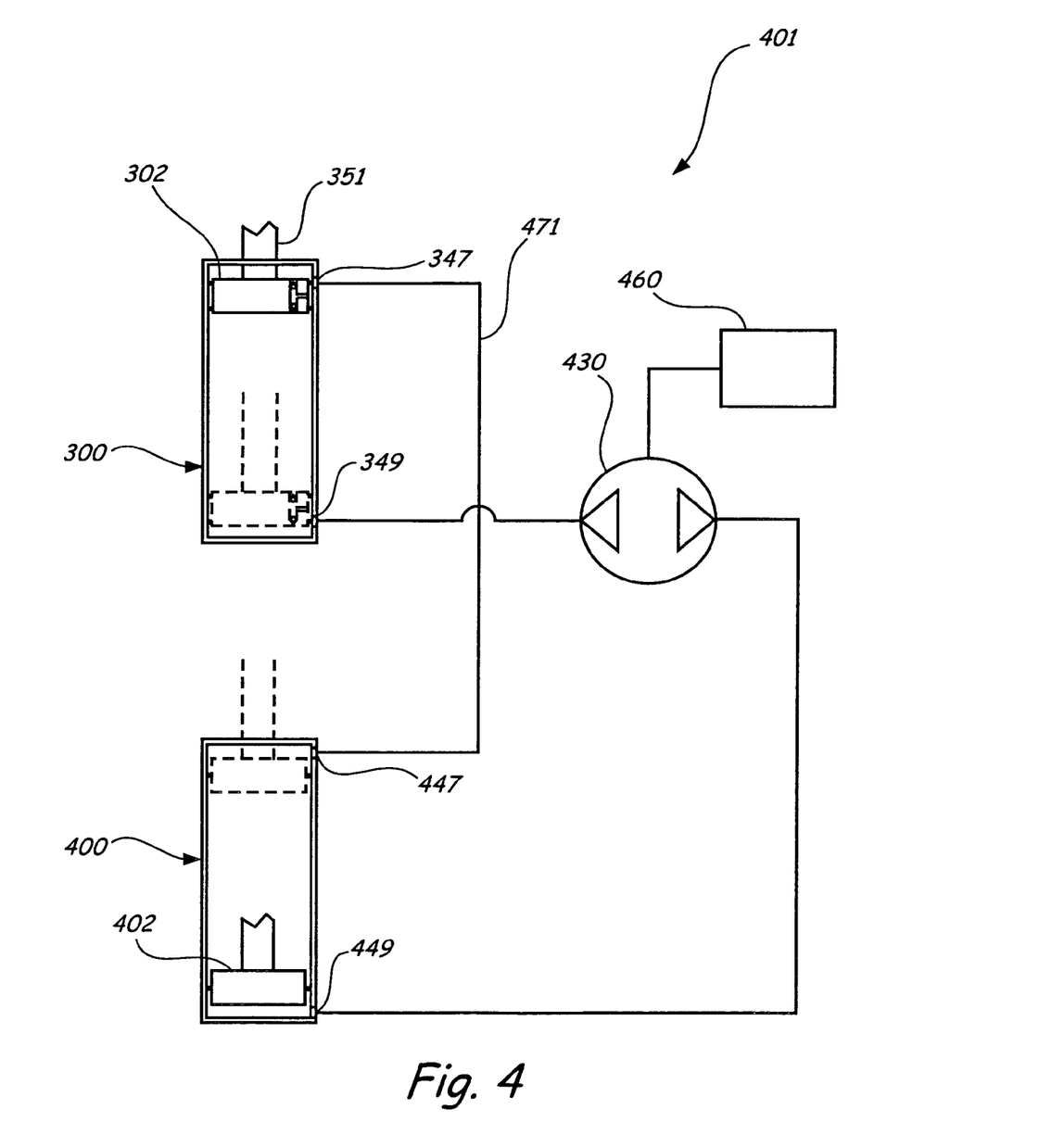
FIG. 4 is a schematic depiction of a fluid system, according to an illustrative embodiment.

FIG. 4 depicts a fluid system 401 that includes cylinder 300 and piston 302 of FIG. 3, with connections to other exemplary fluid system components, such as second cylinder 400, steering control unit 430, and pump 460. Steering control unit 430 may have an input connected to pump 460, or to another source of fluid power, in other embodiments. Steering control unit 430 has controlled output ports fluidly coupled to first and second cylinders 300 and 400 via retraction end ports 349 and 449, respectively. Steering control unit 430 thereby enables a human operator to use fluid system 401, and whatever is operably connected to the pistons and connecting rods associated with the cylinders 300 and 400.

Second cylinder 400 includes piston 402, which does not include passive rephasing bore holes like piston 302, in this illustrative embodiment. In other embodiments of a fluid system, additional pistons may include passive rephasing bore holes, and/or additional cylinders, which may include traditional pistons or passive rephasing bore holes. Other embodiments of fluid systems may also use these cylinders and pistons in combination with other mechanisms for rephasing and/or fluid bypassing.

A fluid connection 471 is disposed between the extension end ports 347, 447 of the first and second cylinders 300, 400, in this illustrative embodiment, while the retraction end ports 349, 449 of the first and second cylinders 300, 400 are connected to either side of steering control 430. In other embodiments, for example, a fluid connection may be disposed between the retraction end ports 349, 449 of the first and second cylinders 300, 400, while the extension end ports are connected to the steering control, for example. Either way, the cylinders 300, 400 will operate such that when one cylinder is being retracted, the other cylinder is being extended, in this illustrative embodiment.

Piston 302 includes a longitudinal fluid passage internally connected with a radial fluid passage, as disclosed with reference to FIG. 3, in this illustrative embodiment, with inlets on the retraction end and the extension end, the inlets being connected by the longitudinal fluid passage which in turn is connected via the radial fluid passage with outlet 327 on the annular side wall of the piston (as best seen in FIG. 3). The longidutinal fluid passage 321 includes check valves in fluid communication with the inlets, the check valves configured to admit a fluid flow from either of the inlets to the outlet on the annular side wall while preventing flow out of either of the inlets (as best seen in FIG. 3). The check valves may be configured to conditionally admit a fluid flow only if a preselected conditional differential pressure occurs from the upstream side of the check valve, on the side with the piston faces, to a downstream side of the check valve, i.e. the side toward the node and the radial fluid passage.

The fluid system 401 may be used, for example, on a vehicle 1 such as disclosed with reference to FIG. 1, where the first cylinder 302 controls steering of the front pair of wheels 3, and the second cylinder 400 controls steering of the back pair of wheels 5 of the wheeled vehicle 1, or vice versa, in different embodiments. Extension of each of cylinders 300, 400 could correspond to turning the respective vehicle wheels to the left or to the right, in various embodiments, while retraction of the same cylinder would correspond to turning the vehicle wheels in the opposite direction. Because the rear wheels should turn complementarily to the front wheels, this means one of cylinders 300, 400 should always retract when the other extends and vice versa, in this particular illustrative embodiment. Other embodiments may have any other type of arrangement between wheels and a fluid system that controls them.

While cylinders 300 and 400 as depicted in FIG. 2 are single-rod cylinders, double-rod cylinders may be used in alternative embodiments. In that case, extension in a first direction of each of the cylinders could correspond to turning the respective vehicle wheels to the left or to the right, in various embodiments, while extension in the second, opposing direction of the same cylinder would correspond to turning the vehicle wheels in the opposite direction. It is understood that for both extension and retraction of a piston in a single-rod cylinder, and extension in either direction in a double-rod cylinder, the extension and/or retraction have maximal positions at either end of the cylinder, in which case the piston occupies a full stroke position at that cylinder end.

It is desirable for the two cylinders 300 and 400 to remain synchronized, so that as one of the cylinders 300 and 400 reaches an extended full stroke position, the other simultaneously reaches a retracted full stroke position, and vice versa. The illustrative embodiment of hydraulic system 401 effectively achieves this desirable characteristic and maintains synchronization between the cylinders 300 and 400, such as by inclusion of piston 302 in cylinder 300, and as further described herein.

The fluid coupling between the extension end ports 347 and 447 are configured so that when pressurized fluid is sent from steering control unit 430 into retraction end port 349 of first cylinder 300, causing cylinder 300 to extend, piston 302 also causes a flow from extension end port 347 of first cylinder 300 to extension end port 447 of second cylinder 400, thereby retracting the connecting rod of second cylinder 400. So, the single fluid flow from steering control unit 430 causes a coordinated action of both cylinders 300, 400 to steer the vehicle 1 to the left. Similarly, when pressurized fluid is sent from steering control unit 430 into retraction end port 449 of second cylinder 400, causing cylinder 400 to extend, piston 402 causes a flow from extension end port 447 of second cylinder 400, through the fluid coupling to extension end port 347 of first cylinder 300, causing the connecting rod of first cylinder 300 to retract. The single fluid flow from steering control unit 430 thereby causes a coordinated action of both cylinders 300, 400 in this illustrative embodiment, which may be applied to steer a vehicle, in one exemplary application.

Piston 302 is configured to provide for the passive, automatic rephasing of cylinders 300 and 400 if they become out of phase with each other—that is, the pistons come to have mismatched positions in their respective cylinders, so that one may reach a full stroke position in its cylinder before the other does. Development of such mismatched phase is a persistent problem in traditional multi-cylinder systems, and have traditionally been addressed by first-order and later hard-to-maintain solutions such as simply trying to calibrate the dimensions of the components and precision of fluid flow to matching values across the different cylinders. In contrast, piston 302 is enabled to continuously and automatically keep a fluid system in matching phase, and correct for any aberration into mismatched phase, by passive, system-correcting action.

Check valves and are disposed within the longitudinal fluid bore passage of piston 302, as described above, admitting flow from either the retraction side work chamber or the extension side work chamber through the side wall outlet and the adjacent port, in the event that the piston 302 is pushed to its full stroke extended or full stroke retracted position and remains under significant differential pressure. The fluid that then bypasses the piston 302 is available both to pass to the opposing side of the piston, and to exit the cylinder 300 altogether. The level of differential pressure required to activate either of the check valves may be preselected, and may be chosen so that the combined differential pressure of both devices is significantly greater than the maximum operating pressure of the fluid system 401, to ensure that both check valves could not be triggered to open at the same time, and interfere with the intended flow directions of the check valves.

In the event of the pistons 302, 402 becoming out of phase with each other, the passively rephasing piston 302 may be either fully extended or fully retracted when a piston in a different cylinder, such as cylinder 400, is not yet fully retracted or extended. Whether passively rephasing piston 302 is ahead or behind the other piston 402 in their mismatched phases, the passively rephasing piston 302 will reach full stroke position in its cylinder 300 on either extension or retraction. Once the passively rephasing piston 302 is in its full stroke position with fluid still driving the other piston 402 through its cylinder 400 on its way to its full stroke position, fluid being directed into the fully driven piston 300 may be admitted through the inlet of the longitudinal bore passage accessible from the respective work chamber and through the respective check valve, and out the side wall outlet, thereby bypassing the passively rephasing piston 302 to pass into the opposing work chamber as well as to exit cylinder 300 via the respective end port. This bypass effect opens a flow path that is otherwise not open, to redirect pressurized fluid still being provided to cylinder 300 from its opposite port out the port adjacent to the piston 302 and to the opposing side of piston 302, passing through cylinder 300 and relieving the pressure in cylinder 300 while pressure is still driving the other piston 402 within its cylinder 400, on its way to resynchronizing its phase with cylinder 302. If the flow is reversed while piston 302 is fully extended and fluid enters cylinder 300 through the end port into which fluid had been bypassing, the check valves in the passages in piston 302 prevent any fluid flow into the main body of the cylinder, and the fluid is forced into the minimized work chamber to push the piston 302 out of its full stroke position and toward the opposite end of cylinder 300.

This fluid bypass mechanism may continue until the other, out-of-phase piston or pistons in the system also reach full extension or retraction, returning all pistons in the system into phase with each other. When the steering is turned to the opposing direction or whatever other mechanism is activated to reverse the flow through the cylinders later, the pistons 302 and 402 start out again from being in phase with each other.

This rephasing effect is thereby achieved passively and automatically, with no need of attention from an operator. It also requires no novel hardware outside of the piston itself, in an illustrative embodiment, thereby providing passive rephasing capability compatible with an otherwise traditional fluid system, with a minimum of alteration or expense.

Figure 5:
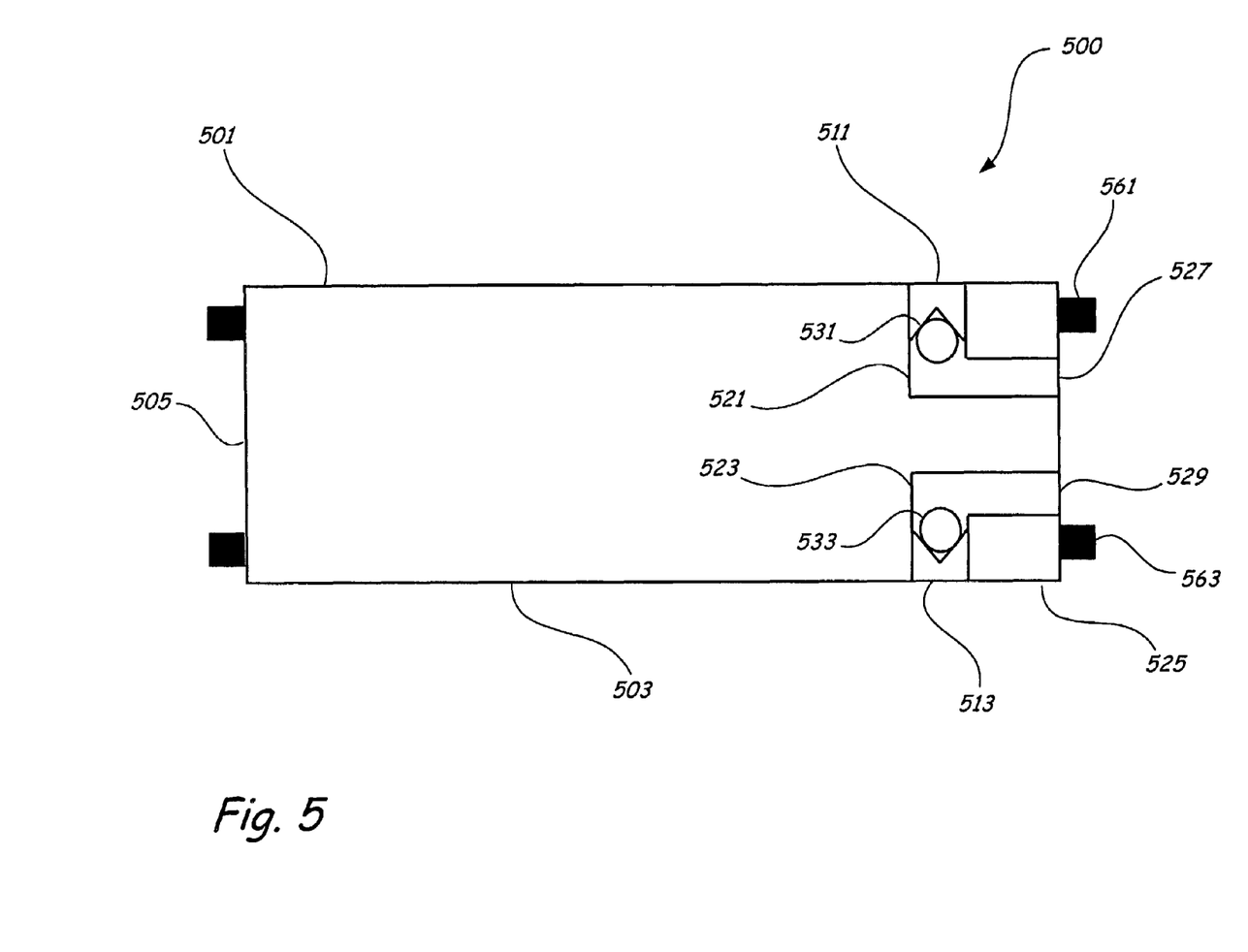
FIG. 5 is a block diagram of a piston, according to an illustrative embodiment.

FIG. 5 depicts a passive rephasing piston 500, according to another illustrative embodiment. Similar to piston 200 of FIG. 2, piston 500 has a first face 501, a second face 503 disposed opposite the first face, and an annular side wall 505 disposed between the first face 501 and the second face 503. Piston 500 also includes a first fluid passage 521 disposed between an inlet 511 on the first face 501 and an annular wall retraction end outlet 527 on annular wall 505, and a second fluid passage 523 disposed between an inlet 513 on the second face 503 and an annular wall extension end outlet 529 on annular wall 505. Annular wall outlets 527 and 529 are both disposed between the piston seals 561, 563.

Piston 500 includes a check valve 531 disposed in first fluid passage 521 between inlet 511 and annular wall retraction end outlet 527, and another check valve 533 disposed in second fluid passage 523 between inlet 513 and annular wall extension end outlet 529. Check valves 231 and 233 are further illustrative examples of one-way passages, configured to admit fluid in one direction but not the other and allow for passive rephasing, where each of the inlets has a dedicated outlet, and no bore passage needs to penetrate through the entirety of the piston 500.

Although the present invention has been described with reference to some particular preferred embodiments, workers skilled in the art will recognize that changes may be made in form and detail without departing from the spirit and scope of the invention. For example, different features described with reference to individual embodiments may be mixed and matched in any permutation in additional embodiments within the scope of the claimed invention. As another example, aspects described in terms of "fluid" or "hydraulic" may be understood to be configurable in other, comparable technologies, such as pneumatic systems. As another example, the term "comprising" is understood as a term of art in patent claims, e.g. to indicate inclusion without implying exclusion of additional components. As a further example, while certain embodiments are described and depicted herein wherein two bypass devices are situated at two particular cylinder ends from among the four cylinder ends, the bypass devices may be situated at any pair of the four cylinder ends in other embodiments, or at any three or all four cylinder ends. Additional cylinders beyond the two depicted herein may also occur in other embodiments, potentially including additional bypass devices used with cylinder ends of the additional cylinders. Other embodiments will be appreciated by those in the art to be apparent or implied from the specification and figures and to lie within the metes and bounds of the claims herein.

What is claimed is:

1. A piston comprising:
a piston body having a first face, a second face disposed opposite the first face, and an annular wall disposed between the first face and the second face;
a longitudinal passage disposed between an inlet on the first face and an inlet on the second face;
a radial passage extending from a node with the longitudinal passage to an outlet on the annular wall between the first seal and the second seal; and
a first one-way passage disposed in the longitudinal passage between the node and the first face, and a second one-way passage disposed in the longitudinal passage between the node and the second face, wherein the first and second one-way passages are disposed to admit fluid in a direction toward the node and not to admit fluid in a direction away from the node.

2. The piston of claim 1, wherein at least one of the one-way passages comprises a check valve.

3. The piston of claim 2, wherein the check valve is one of a ball check valve, a swing check valve, or a clapper valve.

4. The piston of claim 1, wherein at least one of the one-way passages comprises a relief valve.

5. The piston of claim 1, wherein at least one of the one-way passages is configured to admit fluid in the direction toward the node only if a sufficient differential pressure occurs on opposing sides of the one-way passage.

6. The piston of claim 1, further comprising a first seal disposed on the annular wall between the outlet on the annular wall and the first face, and a second seal disposed on the annular wall between the outlet on the annular wall and the second face.

7. The piston of claim 6, wherein the first seal is disposed substantially adjacent to the first face, and the second seal is disposed substantially adjacent to the second face.

8. The piston of claim 1, further comprising a connecting rod connected to the piston body, intersecting at least one of the first face and the second face.

9. A cylinder comprising:
a retraction end wall, an extension end wall, and a cylindrical side wall disposed between the retraction end wall and the extension end wall;
a retraction end port in the cylindrical side wall, substantially adjacent to the retraction end wall, and an extension end port in the cylindrical side wall, substantially adjacent to the extension end wall;

an internally disposed piston; and a connecting rod operably connected to the piston and disposed through the retraction end wall;

wherein the piston comprises:

a piston body having a retraction end face facing the retraction end wall, an extension end face facing the extension end wall, and an annular wall that conformingly opposes the cylindrical side wall;

a first fluid passage disposed through the piston from a retraction chamber inlet disposed on the retraction end face to an annular wall retraction end outlet disposed on the annular wall, the first fluid passage comprising a one-way valve enabling fluid flow from the retraction chamber inlet to the annular wall retraction end outlet, and blocking fluid flow from the annular wall retraction end outlet to the retraction chamber inlet; and a second fluid passage disposed through the piston from an extension chamber inlet disposed on the extension end face to an annular wall extension end outlet disposed on the annular wall, the second fluid passage comprising a one-way valve enabling fluid flow from the extension chamber inlet to the annular wall extension end outlet, and blocking fluid flow from the annular wall extension end outlet to the extension chamber inlet.

10. The cylinder of claim 9, wherein the annular wall retraction end outlet and the annular wall extension end outlet are comprised in a single annular wall outlet disposed on the annular wall.

11. The cylinder of claim 9, wherein at least one of the one-way valves comprises a check valve.

12. The fluid system of claim 9, wherein at least one of the one-way valves is configured to enable fluid flow dependent on a condition of sufficient differential pressure being met between the pressures on opposing sides of the one-way valve.

13. The cylinder of claim 9, further comprising a first seal disposed on the annular wall between the extension end face and the annular wall extension end outlet, and a second seal disposed on the annular wall between the retraction end face and the annular wall retraction end outlet, the first and second seals translatingly engaging the cylindrical side wall.

14. The cylinder of claim 13, wherein the first seal is disposed adjacent to the extension end port when the piston is adjacent to the extension end wall, such that fluid is enabled to bypass the second seal.

15. The cylinder of claim 13, wherein the second seal is disposed adjacent to the retraction end port when the piston is adjacent to the retraction end wall, such that fluid is enabled to bypass the first seal.

16. A fluid system comprising:

first and second cylinders, each comprising a piston, a retraction end corresponding to a full stroke retraction position of the piston, an extension end corresponding to a full stroke extension position of the piston, a retraction end port adjacent to the retraction end, and an extension end port adjacent to the extension end; and a fluid connection disposed either between the retraction end ports of the first and second cylinders or between the extension end ports of the first and second cylinders;

wherein at least one of the pistons comprises a fluid passage through the piston with inlets on the retraction end and the extension end, the inlets connected by a fluid passage with an outlet on the annular sidewall of the piston, the fluid passage comprising check valves in fluid communication with the inlets, the check valves configured to admit a fluid flow from either of the inlets to the outlet on the annular sidewall while preventing flow out of either of the inlets.

17. The fluid system of claim 16, wherein each of the check valves is configured to conditionally admit a fluid flow only if a preselected conditional differential pressure occurs from an upstream side of the check valve to a downstream side of the check valve.

18. The fluid system of claim 17, wherein a sum of the preselected conditional differential pressures of the check valves is greater than an operating pressure of the fluid system.

19. The fluid system of claim 17, further comprising a steering control unit that is fluidly coupled to the first and second cylinders via either the retraction end ports of the first and second cylinders or the extension end ports of the first and second cylinders, whichever do not have the fluid connection disposed between them.

20. The fluid system of claim 16, wherein the first cylinder controls steering of either a front pair of wheels or a back pair of wheels of a wheeled vehicle, and the second cylinder controls steering of the other of the front pair of wheels or the back pair of wheels of the wheeled vehicle.

\* \* \* \* \*